Oct. 7, 1958 G. F. ROGERS 2,855,458

AUTOMATIC GAIN CONTROL AND SYNC SEPARATOR CIRCUITS

Filed Oct. 21, 1955

INVENTOR.
GORDON F. ROGERS

BY [signature]

ATTORNEY

United States Patent Office 2,855,458

Patented Oct. 7, 1958

2,855,458

AUTOMATIC GAIN CONTROL AND SYNC SEPARATOR CIRCUITS

Gordon F. Rogers, Lincolnwood, Ill., assignor to Radio Corporation of America, a corporation of Delaware Application October 21, 1955, Serial No. 541,905

6 Claims. (Cl. 178—7.3)

Figures 1, 2:
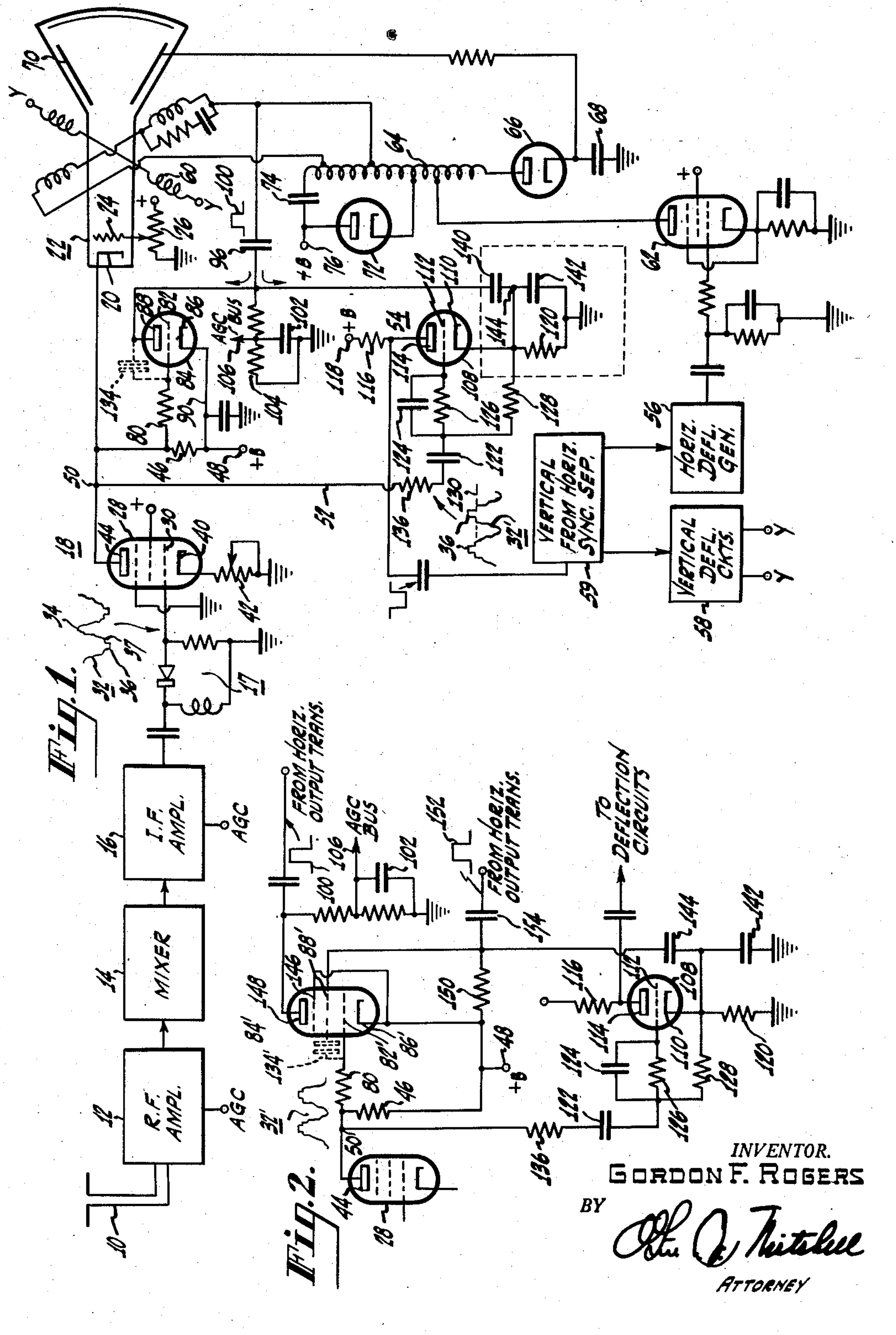

The present invention relates to new and improved keyed or gated automatic gain control (A. G. C.) and synchronizing pulse separating circuitry for television receivers.

Automatic control of the gain of the radio frequency (R. F.) and intermediate frequency (I. F.) amplifying circuits in a television receiver is highly desirable. With automatic gain control, the overall amplification of the signal is automatically reduced with increasing signal strength to apply a relatively constant input signal to the video demodulating circuits, despite the fact that the strength of the received signal may vary over a wide range. A. G. C. thus overcomes the deleterious effect of the different signal strengths encountered when tuning between television channels, eliminates the effects of varying energizing potentials which tend to alter the gain of the video I. F. amplifying circuits and also tends to eliminate variations caused by moving objects near the antenna system, such as airplanes, for example.

By reason of the fact that the direct current (D. C.) component of the television signal is transmitted, the average carrier level of the television picture signal is not constant and it is desirable that the A. G. C. circuitry of a receiver be made responsive to the sync level in order to indicate signal strength. Since deflection synchronizing pulses occupy a relatively small portion of a composite television signal, timewise, improved noise immunity of A. G. C. has been obtained through the use of keyed A. G. C. circuits which are sensitive to the incoming signal only during the occurrence of the synchronizing pulses. In one such circuit arrangement, the anode conduction of the A. G. C. tube is controlled by gating pulses generated in the deflection circuits during the retrace intervals of the horizontal scanning cycle, so that anode conduction of the A. G. C. tube is proportional to the video signal during only the gating periods.

In certain television receivers, the synchronizing pulse separation function is performed by an electron discharge tube which is supplied with the demodulated, composite video signal from the same point in the receiver as that from which the A. G. C. tube receives its version of the composite signal. Where the A. G. C. tube is a triode, for example, whose anode is supplied with positive keying pulses, it has been found that the interelectrode capacitance of the A. G. C. tube feeds through the keying pulses or versions thereof to the control grid of the tube and that the fed-through pulses then find a path through to the input terminal of the sync separator tube, thereby undesirably affecting the operation of the latter.

As disclosed in a copending application of the present applicant, Serial No. 541,904, filed October 21, 1955, for "Keyed Automatic Gain Control Circuits," it has also been proposed to use a tube having a screen grid electrode for the A. G. C. function, the screen grid being energized, at least in part, by positive-going pulses derived from a suitable source such as the horizontal deflection transformer of the receiver, in order to render the A. G. C.

tube capable of retaining control of the receiver gain even during out-of-sync conditions. It has been found, however, in the case of the latter described arrangement, that the screen-grid-to-control-grid capacity furnishes a path for pulse feed-through from the screen grid to the control grid, so that similar undesirable effects are produced in the sync separator circuit.

It is, therefore, a primary object of the present invention to provide novel means for neutralizing, in a sync separator circuit, the effects of pulses applied to a keyed automatic gain control arrangement coupled to the sync separator circuit.

According to a specific, illustrative form of the invention, there is provided an A. G. C. circuit including a tube having at least a cathode, control grid electrode and a further eletcrode. The composite television signal, including image portions and recurrent blanking and synchronizing portions, is applied to the control grid of the tube whose further electrode is pulsed by positive pulses occuring during the horizontal retrace intervals of the television scanning cycle in the receiver. A synchronizing pulse separating circuit is supplied with a version of the composite television signal from the same source and serves to separate the sync pulses from the remaining portion of the signal for use in synchronizing the scanning deflection circuits of the receiver. By reason of the fact that the signal source is common to both the A. G. C. tube and to the sync separator tube, the source serves as a path for the feeding through of keying pulses from the A. G. C. tube to the sync separator tube. These fed-through pulses are substantially neutralized in the sync separator tube in accordance with the present invention by applying pulses corresponding to the fed-through pulses to the sync separator tube in such manner as to counteract the fed-through pulses, so that the operation of the sync separator circuit is substantially free of any undesirable effect by reason of the fed-through pulses.

As will be recognized from the following, the advantageous results afforded by the present invention may be had through the addition of only a relatively few circuit components to existing receiver circuitry.

Additional objects and advantages of the present invention will become apparent to those skilled in the art from a study of the following detailed description of the accompanying drawing, in which:

Figure 1 illustrates, by way of a block and schematic diagram, a television receiver embodying circuitry in accordance with one form of the invention; and Figure 2 is a schematic diagram of another form of the invention.

Referring to Figure 1, there is shown a television receiver in connection with which the present invention will be described. Composite television signals, including video or image portions and blanking and synchronizing portions, are intercepted by an antenna 10 and applied to the input terminals of an R. F. amplifier stage 12. The amplified radio frequency carrier wave is heterodyned with a locally produced wave in a mixer 14 to provide a video-modulated intermediate frequency wave which is applied to the I. F. amplifier channel 16. The I. F. channel may conventionally comprise a plurality of amplifying stages which may, for example, serve to amplify both the television and sound I. F. signals. A demodulating circuit 17 is coupled to the I. F. amplifying channel 16 for deriving the composite television signal from the carrier wave. The detected signals are amplified in a video frequency amplifying circuit 18 and are thereafter applied to the cathode 20 of an image reproducing kinescope 22 whose control grid electrode 24 is adjustably connected to a background control potentiometer 26. Sound I. F. signals may be taken off at a suitable point in the video amplifier circuit and applied to suitable transducing circuits (not shown).

The video amplifier circuit includes an amplifier tube 28 whose control electrode 30 receives the detected composite television signal 32 which includes image portions 34 and synchronizing portions 36 superimposed on blanking pedestals 37 in the usual manner. The cathode 40 of the video amplifier tube 28 is connected through an adjustable contrast control resistor 42 to a point of fixed potential (e. g., ground). The anode 44 of the video amplifier tube is connected through a load resistor 46 to a source of positive operating potential (+B) at the power supply terminal 48. The power supply (not shown) may be of any suitable variety such as one including a rectifier and filtering network.

As will be noted from the waveform 32, the polarity of the input signal to the video amplifier tube 28 is such that the synchronizing pulses extend in the negative direction. The amplified signal available at the output terminal 50 of the video amplifier is applied via the lead 52 to a synchronizing pulse separating circuit 54 which serves, in a manner to be described more fully hereinafter, to separate the horizontal and vertical synchronizing pulses from the composite signal for later application to horizontal and vertical deflection wave generators 56 and 58, respectively. It will be understood that the horizontal and vertical synchronizing pulses are separated from each other in a conventional circuit represented by the block 59. The vertical deflection circuits serve to drive a saw-tooth current of television field frequency through a vertical deflection winding 60, while the horizontal deflection generator applies a sawtooth voltage of television line frequency to the input of a horizontal deflection output tube 62.

The horizontal deflection circuit further includes a transformer 64 connected in the anode conduction path of the discharge tube 62 and a high voltage rectifying tube 66 which serves to rectify the current flyback pulses produced in the transformer during line retrace intervals. The rectified pulses afford a high, unidirectional voltage which, after filtering by a capacitor 68, is applied to the final anode 70 of the kinescope 22. The horizontal deflection circuit, illustrated as one of conventional arrangement, further includes a damper diode 72 and B-boost storage capacitor 74 which is serially connected between the +B terminal 76 and the end of the transformer winding remote from the anode of the horizontal discharge tube 62.

The output terminal 50 of the video amplifier circuit is also connected via an isolating resistor 80 to the control electrode 82 of a keyed A. G. C. triode 84. The A. G. C. tube includes additionally a cathode 86 and an anode 88. The A. G. C. tube cathode 86 is directly connected via a lead 90 to the +B terminal 48 in the anode circuit of the video amplifier tube 28. A connection, including a capacitor 96, between the transformer 64 and the anode of the A. G. C. tube 84 serves to apply to the anode positive pulses 100 which are developed across the transformer winding 64 during the horizontal retrace or flyback intervals. Each such pulse 100 thus tends to render the A. G. C. tube 84 conductive for its duration, in a known manner. Such conduction of the A. G. C. tube effects the storage of a charge on a further capacitor 102 which is connected operatively to the anode 88 of the tube. The amount of charge thus deposited in the capacitor 102 during each retrace portion of the horizontal scanning cycle is a function of the degree of conduction of the A. G. C. tube. This tube, as will be appreciated, conducts in proportion to the synchronizing pulse signal strength of the detected wave, by reason of the application of the video signal to its control grid 82.

At this point, it may be noted that the filter network coupled to the anode of the A. G. C. tube 84 includes a resistor 104 connected in shunt with the capacitor 102. The potential across the capacitor 102 is negative with respect to ground and constitutes the A. G. C. voltage which is applied via the A. G. C. bus 106 to the R. F. amplifier circuit 12 and to one or more of the I. F. amplifying tubes in the channel 16. Suitable decoupling networks of known variety may be included in the connections between the A. G. C. bus 106 and the various I. F. and R. F. amplifier stages.

As thus far described, the apparatus of Figure 1 accords with conventional practice. Referring now in greater detail to the sync separator circuit 54, it will be noted that the circuit includes an electron discharge tube 108 having a cathode 110, control grid 112 and anode 114. The anode is connected through a load resistor 116 to a source of +B potential at the terminal 118, while the cathode 110 is connected through a resistor 120 to a point of fixed potential (viz., ground). The amplified composite television signal indicated by the waveform 32' is applied via the capacitor 122 and a self-biasing grid circuit comprising the parallel combination of a capacitor 124 and resistor 126 to the control grid 112 of the sync separator tube. A large grid-leak resistor 128 connects the junction of the coupling capacitor 122 and the self-biasing circuit to the cathode 110 of the sync separator tube.

In the normal operation of the sync separator circuit, the incoming video signal 32', whose sync pulses 36 extend in the positive direction, causes the sync separator tube to draw grid current which establishes a negative bias on the control grid 112, as indicated by the dotted line 130. Thus, only the synchronizing pulse portions 36 of the wave cause anode conduction of the sync separator tube 108, the video portions of the signal being insufficient to overcome the self-bias developed by the tube. Such anode conduction of the sync separator tube results in a negative-going pulse for each synchronizing pulse 36, which negative pulse is applied to the further separating circuit 59 in a known manner.

As has been found by the present applicant, the inter-electrode capacity between the anode 88 and control grid 82 of the A. G. C. tube (represented at 134 in dotted lines) serves as a feed-through path for pulses from the anode 88 to the control grid 82, which pulses appear across the load resistor 46 of the video amplifier tube. The isolating resistor 80 has further been found to have little effect upon the amount of voltage which thus appears across the load resistor since, although the resistor 80 may normally be of the order of 47 kilohms and the load resistor 46 of the order of 5 kilohms, the reactance of the capacity 134 is large compared to the resistor 80 for the frequencies involved. The fed-through voltage which thus appears as a differentiated pulse across the load resistor 46 finds a path to the control grid 112 of the sync separator tube through the resistor 136, coupling capacitor 122, and the parallel combination of resistor 126 and capacitor 124. These enumerated components normally have little effect upon the overall amplitude of the fed-through signal, since the circuit operations should be considered for the case of zero conduction (i. e., open circuit of the control grid 112). Moreover, the grid resistor 128 is normally sufficiently large that the shunting current is not appreciable.

In order to neutralize or overcome the effect of the fed-through voltage pulse from the anode 88 of the A. G. C. tube to the control grid 112 of the sync separator tube, as described above, the additional circuitry shown in Figure 1 is provided. Specifically, the apparatus added to the circuitry comprises a pair of capacitors 140 and 142 connected serially between the anode 88 of the A. G. C. tube and a point of reference potential (e. g., ground), the junction 144 of the capacitors 140 and 142 being connected to the cathode 110 of the sync separator tube. In view of the foregoing described effects of the several components connected between the A. G. C. tube and the sync separator tube, it has been found that the primary feed-through path of pulses from the anode of the A. G. C. tube to the control grid of the sync separator tube is made up of the inter-electrode capacity 134 and load resistance 46. Thus, by selecting the values of the capacitor 140 and the resistor 120 so that they satisfy the following relationship, the same voltage waveform which is fed through to the control grid of the cync separator tube may be caused to appear on the cathode of that tube:

$$\frac{C_{140}}{R_{120}}=\frac{C_{134}}{R_{46}}$$

The capacitor 142 is provided across the cathode resistor 120 of the sync separator to compensate for the effects of stray capacity to ground of the enumerated components which are located electrically between the control grid of the keyed A. G. C. tube and the sync separator tube. By virtue of the application to the cathode 110 of the sync separator tube of a voltage waveform of substantially the same shape as that which is fed through to its control grid, the fed-through voltage appearing on the control grid 112 is substantially neutralized, that is, has substantially no effect of producing a potential difference between the control grid and cathode of the sync separator tube. While, in the foregoing explanation, it has been assumed that the control grid of the sync separator tube was non-conducting, the neutralizing action of the present invention is equally effective when the control grid 112 does draw current, since the conduction resistance is between two points (i. e., cathode and control grid) which are at the same potential insofar as the undesired pulse waveform is concerned. Although the resistor 120 is added in accordance with the present invention for the purpose of producing a voltage waveform at the cathode 110 of the sync separator tube, the presence of the resistor affects the sync separation action of the tube only in that it reduces slightly the effectiveness of the input signal amplitude. This loss of signal amplitude, is, however, outweighed by the elimination of undesirable pulses from the signal in the sync separator tube.

In the interest of completeness of description, there follows a list of values for the various components involved between the A. G. C. tube and sync separator tube for one illustrative circuit:

$R_{80}$=33K
$R_{46}$=5.5K
$R_{136}$=18K
$R_{126}$=470K
$R_{128}$=4.7 megohms
$R_{120}$=390 ohms
$C_{122}$=2200 micro-micro farads
$C_{124}$=150 micro-micro farads
$C_{140}$=47 micro-micro farads
$C_{142}$=1500 micro-micro farads Figure 2 illustrates another form of the invention, namely, one designed to neutralize the effects of pulse feed-through from the screen grid electrode of a certain form of keyed A. G. C. tube. That is to say, there is disclosed in the cited copending application of the present applicant an arrangement of a keyed A. G. C. circuit in which the A. G. C. tube is one having a screen grid electrode (in order to eliminate or minimize the effect of anode to control grid capacity) and in which at least a portion of the positive operating potential for the screen grid is provided by positive pulses applied to the screen grid in synchronism with the positive keying pulses applied to its anode. Figure 2 illustrates such an arrangement, reference numerals identical to those employed in Figure 1 being used to identify corresponding elements.

In Figure 2, the video amplifier tube 28 provides at its output terminal 50 the amplified composite television signal 32′ which is applied via an isolating resistor 80 to the control grid 82′ of the A. G. C. tube 84′ which further includes a cathode 86′, screen grid 88′, suppressor grid 146 and anode 148. The cathode 86′ of the A. G. C. tube is connected directly to the +B terminal 48 of the video amplifier and a positive voltage is applied from that terminal to the screen grid 88′ via a series dropping resistor 150. Positive keying pulses 100 derived from the horizontal output transformer, for example, are applied via the capacitor 96′ to the anode 148 of the A. G. C. tube. The positive voltage at the screen grid 88′ is insufficient for the normal operation of the tube and is supplemented, as described in the cited application, by positive pulses 152 derived from the horizontal output transformer and applied via a capacitor 154 to the screen grid 88′. These positive pulses 152 are of sufficient amplitude when added to the static potential of the screen grid to permit anode-cathode conduction to occur in the A. G. C. tube when its anode is keyed by the pulse 100. An A. G. C. voltage is thus developed across the capacitor 102 and is applied via the A. G. C. bus to the various R. F. and I. F. amplifier stages.

In an arrangement of the type thus far described in connection with Figure 2, it has been found that the interelectrode capacity between the screen grid 88′ and control grid 82′ of the A. G. C. tube furnishes a path for the pulses 152 from the screen grid 88′ to the control grid, which pulses then appear across the load resistor 46 of the video amplifier tube and are coupled, in the manner described in connection with Figure 1, via the elements 136, 122, 124, 126 and 128 to the control grid 112 of the sync separator tube 108. As in the case of the arrangement of Figure 1, the apparatus of Figure 2 includes a resistor 120 connected between the cathode of the sync separator tube and a point of fixed potential for developing a voltage at the cathode. This voltage is a result of the feeding of pulses 152 from the screen grid 88′ of the A. G. C. tube via the capacitors 144 and 142 to the cathode 110 of the sync separator tube. With the capacitor 144 proportioned with respect to the resistor 120 as the interelectrode capacity 134′ is to the load resistor 46, the neutralizing waveform applied to the cathode 110 of the sync separator tube is substantially the same as that which reaches the control grid 112 through the feed-through path.

From the foregoing, it will be recognized that, as in the case of Figure 1, the arrangement of Figure 2 provides means for neutralizing the effects on the sync separator tube of a pulse waveform fed via the interelectrode capacity from a pulsed electrode of the A. G. C. tube to its control grid. This neutralization, moreover, is effected through the addition of only the capacitors 140 and 142 and resistor 120.

Having thus described my invention, what I claim as new and desire to secure by Letters Patent is:

1. In a television receiver having an amplifying channel for operating upon a composite television signal which includes image portions and a recurrent reference portions, an automatic gain control circuit for controlling the gain of said channel, said circuit including a normally non-conductive electron discharge device having a conduction controlling electrode, means for applying a composite television signal from said channel to said conduction controlling electrode including its direct current component and with said recurrent reference portions of such polarity tending to cause conduction of said device, a source of keying pulses, and means for applying pulses from said source to said device for keying said device periodically and at substantially the same rate as such recurrent reference portions, the polarity of such pulses being such as to cause said device to conduct; circuit means coupled to said channel for receiving composite television signals therefrom and for separating such recurrent reference portions from the remainder of such signals, said separating circuit means being coupled to said electron discharge device through said coupling means such that such keying pulses are undesirably fed through said coupling means from said electron discharge device to said separating circuit when said device is keyed; and means for applying pulses from said source to said separating circuit means with such polarity and amplitude as to cancel the effect of said fed-through pulses upon said separating circuit means.

2. In a television receiver having an amplifying channel for operating upon a composite television signal which includes image portions and recurrent reference portions, an automatic gain control circuit for controlling the gain of said channel, said circuit including a normally non-conductive electron discharge device having a conduction controlling electrode and an anode, means for applying a composite television signal from said channel to said conduction controlling electrode including its direct current component and with said reference portions extending in the direction tending to cause conduction, a source of keying pulses, and means for keying said device periodically at substantially the frequency of such recurrent reference portions with pulses from said source of such polarity as to cause said device to conduct; circuit means coupled to said channel for receiving composite television signals therefrom and for separating such recurrent portions from the remainder of such signals, said electron discharge device having interelectrode capacity between said anode and said conduction controlling electrode which serves to apply undesired pulses to said separating circuit when said device is keyed; and means for applying pulses from said source to said separating circuit with such polarity and amplitude as to cancel such undesired pulses, whereby to render such undesired pulses ineffective to alter the operation of said separating circuit.

3. In a television receiver having an amplifying channel for operating upon a composite television signal which includes image portions and recurrent reference portions, an automatic gain control circuit for controlling the gain of said channel, said circuit including an electron discharge device having a conduction controlling electrode and an anode, means for applying a composite television signal from said source to said conduction controlling electrode including its direct current component and with such reference portions of such polarity as to tend to produce conduction of said device, a source of keying pulses, and means for keying the anode of said device periodically at substantially the frequency of such recurrent reference portions with pulses from said source of such polarity as to cause said device to conduct; circuit means including a second electron discharge device coupled to said channel for receiving composite television signals therefrom and for separating such recurrent reference portions from the remainder of such signals, said first electron discharge device having interelectrode capacity between said anode and said conduction controlling electrode which serves to apply undesired pulses to said separating circuit when said first device is keyed; and means for applying pulses from said source to said second electron discharge device of such polarity and amplitude as to cancel such undesired pulses, whereby to render such undesired pulses ineffective to alter the operation of said second electron discharge device.

4. In a television receiver having an amplifying channel for operating upon a composite television signal which includes image portions and recurrent reference portions, an automatic gain control circuit for controlling the gain of said channel, said circuit including an electron discharge device having a control electrode, an anode and a cathode; amplifier means coupled to said channel and having an output circuit across which composite television signals are produced; coupling means for applying composite television signals from said output circuit to said control electrode of said electron discharge device including their direct current component and with such reference portions of such polarity as to tend to produce conduction; a source of keying pulses; means for applying pulses from said source between the anode and cathode of said device for keying said device periodically and at substantially the frequency of such recurrent reference portions, said pulses being of such polarity as to cause said device to conduct; circuit means coupled to said amplifier output circuit for receiving composite television signals therefrom and for separating such recurrent reference portions from the remainder of such signals, said electron discharge device having interelectrode capacity which serves to apply undesired pulses across said output circuit of said amplifier means when said electron discharge device is keyed, such that said separating circuit means receives undesired pulses corresponding to such keying pulses; and means for applying pulses from said source to said separating circuit means of such polarity and amplitude as to tend to cancel such undesired pulses, whereby to neutralize the effect of such undesired pulses applied to said separating circuit means.

5. In a television receiver having an amplifying channel for operating upon a composite television signal which includes image portions and recurrent reference pulse portions, an automatic gain control circuit for controlling the gain of said channel, said circuit including an electron discharge tube having a cathode control grid and further electrode and means biasing said tube so that it is normally non-conductive; an amplifier coupled to said channel in signal receiving relation therewith and having a load impedance in its output circuit across which there is produced an amplified version of such composite television signal; coupling means for applying signals from said load impedance to the control grid of said automatic gain control circuit electron discharge tube for controlling the degree of conduction of said tube; a source of keying pulses; means for applying pulses from said source to said further electrode of said tube for causing conduction of said tube; pulse separating circuit means including a second electron discharge tube having a cathode, control grid and anode for separating such recurrent pulse portions of said composite signal from the remainder of said signal; means for applying composite television signals from said amplifier load impedance to said control grid of said second tube, said first electron discharge tube having interelectrode capacity between said further electrode and said control grid which serves to apply undesired pulses across said load impedance when said first electron discharge tube is keyed, the waveform of such undesired pulses being determined by the relative values of such interelectrode capacity and said load impedance; an impedance connected between said cathode of said second tube and a point of fixed potential; and capacitive means coupled between said pulse source and said cathode of said second tube for applying pulses to said second tube in such manner as to neutralize the effect of such undesired pulses on the operation of said second tube.

6. In a television receiver having an amplifying channel for operating upon a composite television signal which includes image portions and recurrent reference pulse portions, an automatic gain control circuit for controlling the gain of said channel, said circuit including an electron discharge tube having a cathode, control grid and further electrode and means biasing said tube so that it is normally non-conductive; an amplifier coupled to said channel in signal receiving relation therewith and having a load impedance in its output circuit across which there is produced an amplifier version of such composite television signal; coupling means for applying signals from said load impedance to the control grid of said automatic gain control circuit electron discharge tube for controlling the degree of conduction of said tube; a source of keying pulses; means for applying pulses from said source to said further electrode of said tube for causing conduction of said tube; pulse separating circuit means including a second electron discharge tube having a cathode, control grid and anode for separating such recurrent pulse portions of said composite signal from the remainder of said signal; means for applying composite television signals from said amplifier load impedance to said control grid of said second tube, said first electron discharge tube having interelectrode capacity between said further electrode and said control grid which serves to apply undesired pulses across said load impedance when said first electron discharge tube is keyed, the waveform of such undesired pulses being determined by the relative values of such interelectrode capacity and said load impedance; an impedance connected between said cathode of said second tube and a point of fixed potential; and capacitive means coupled between said pulse source and said cathode of said second tube for applying pulses to said second tube in such manner as to neutralize the effect of such undesired pulses on the operation of said second tube, said last-named capacitance and impedance being related in substantially the same proportion as said interelectrode capacity and said load impedance.

References Cited in the file of this patent

UNITED STATES PATENTS

| | | |
|---|---|---|
| 2,637,772 | Wendt | May 5, 1953 |
| 2,636,939 | Wissel et al. | Apr. 28, 1953 |